March 19, 1929.  J. ROBBINS  1,705,878
SANDING MACHINE
Filed Oct. 15, 1927
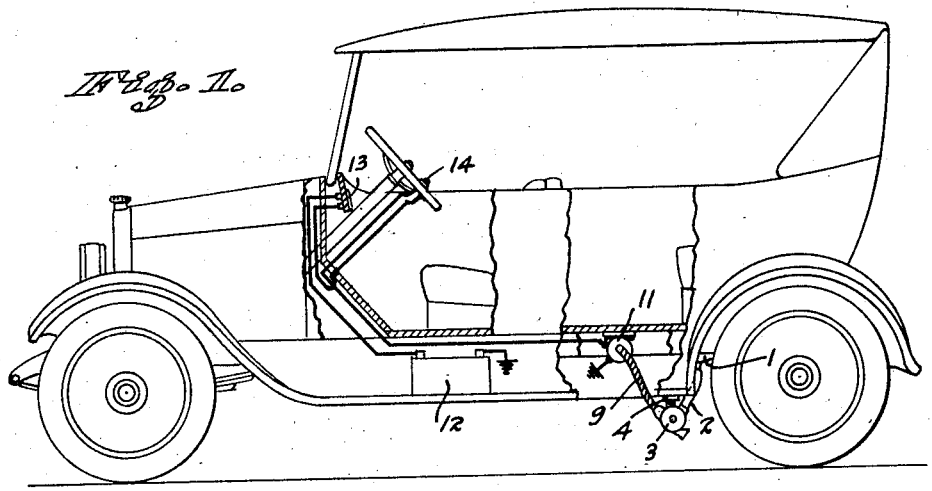
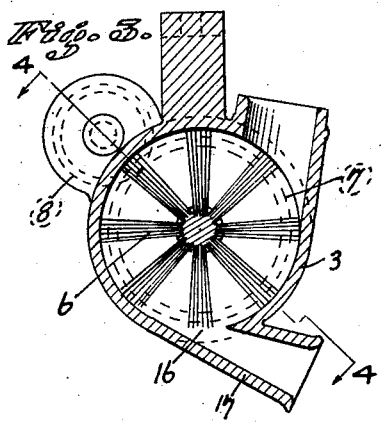
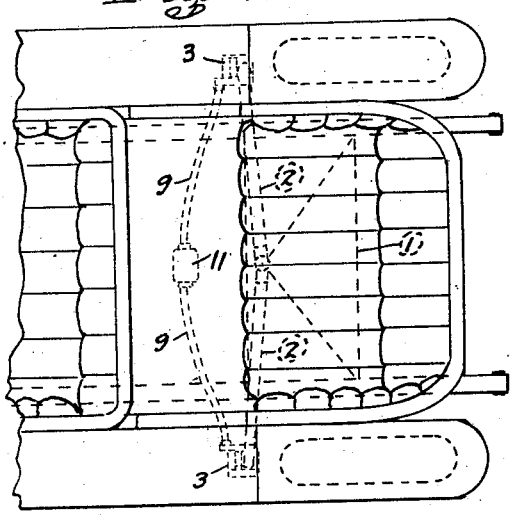
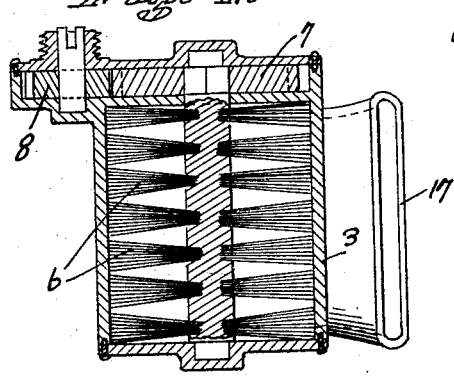
INVENTOR.
JOHN ROBBINS
BY
ATTORNEYS.

Patented Mar. 19, 1929.

1,705,878

UNITED STATES PATENT OFFICE.

JOHN ROBBINS, OF SAN FRANCISCO, CALIFORNIA.

SANDING MACHINE.

Application filed October 15, 1927. Serial No. 226,432.

The present invention relates to improvements in sanding machines, and the object of the invention is to provide a convenient means in connection with a vehicle, allowing the driver thereof to spread sand in front of the wheels for the purpose of preventing skidding of the latter on slippery roads. A more particular object of the invention is to provide a sanding machine of the character described which is motor driven and subject to the control of the driver of the vehicle from the driver's seat. A further object of the invention is to provide a distributing means for the sand allowing the latter to be placed in front of the wheel in such a manner as to be most effective for the purposes set forth. A further object of the invention is to arrange the sanding machine in such a manner that it will normally be inactive and will become active only upon positive actuation by the operator.

Further objects and advantages of my invention will appear as the specification proceeds.

The preferred form of my invention is illustrated in the accompanying drawing in which Figure 1 shows my sanding device as installed in a motor vehicle, in side elevation;

Figure 2, a top plan view of a motor vehicle having my sanding device attached thereto, the front portion of the vehicle being omitted;

Figure 3, a vertical section through the main operating part of my sanding device; and Figure 4, a section taken along line 4—4 of Figure 3.

While I have shown only the preferred form of the invention, I wish to have it understood that various changes or modifications may be made within the scope of the claims hereto attached without departing from the spirit of the invention.

In its preferred form my sanding machine comprises a suitable receptacle 1 for sand adapted to be fastened to the frame or body of the vehicle in any suitable manner, and connected by means of a conduit 2 to the cylindrical housing 3, which latter is preferably fastened by means of brackets 4 to the underside of the running board of a motor vehicle in front of a rear wheel thereof. The housing 3 has a rotary brush 6 therein, which latter is adapted to be rotated by means of a gear wheel 7 meshing with a pinion 8 also supported in the housing, and the latter pinion is connected through a flexible shaft 9 with a motor 11 preferably secured to the bottom of the body of the vehicle. The motor may be driven by means of a battery 12 and its circuit preferably includes the ammeter 13 and a switch 14 mounted upon the steering wheel so as to be of convenient access to the driver.

The conduit 2 feeds into the housing 3 tangentially and an outlet port 16 discharges the sand through a flat nipple 17 which evenly distributes the sand over an area slightly wider than the vehicle wheel.

For effective operation it is desirable that a sanding machine be employed for each of the rear wheels as indicated in dotted lines in Figure 2, and in order to allow such arrangement to be conveniently operated by a single motor I mount the motor centrally of the car and the hopper 1 is also preferably mounted centrally of the vehicle, so that two conduits 2 slant downwardly from the receptacle to the two housings three and two flexible shafts extending from opposite sides of the motor 11 operate the two sanding devices.

The manner of operating my sanding device will be readily understood from the foregoing description. Sand drops from the receptacle 1 through the two conduits 2 into the housing 3 and is normally supported by the rotary brush 6, which latter is normally held against rotation by the reduction gearing 7 and 8 and the resistance offered by the motor. If the driver desires to discharge sand in front of his two rear wheels he presses the button 14 which causes the motor to become active and to revolve the brush 6. The sand lodged between the bristles of the brush is carried around by the brush until it reaches the port 16, whereupon it is discharged tangentially through the nozzle 17 by gravity and centrifugal force.

The rotary brush serves to finely distribute the sand, so that after being sprayed from the nozzle 17 the sand is placed in front of the vehicle wheel in an even strip.

I claim:

A sanding machine of the character described, comprising a sand receptacle, a rotary brush having axial rows of radial bristles spaced to form pockets between the rows, a cylindrical housing surrounding the brush and communicating with the receptacle so as to receive sand therefrom by gravity, a discharge port in the housing allowing sand to be discharged therethrough and means for revolving the brush.

JOHN ROBBINS.